United States Patent [19]

Ihara et al.

[11] Patent Number: 4,677,175

[45] Date of Patent: Jun. 30, 1987

[54] ETHYLENE/TETRAFLUOROETHYLENE COPOLYMER

[75] Inventors: Kiyohiko Ihara, Suita; Tsuneo Nakagawa, Ibaraki, both of Japan

[73] Assignee: Daikin Industries Ltd., Osaka, Japan

[21] Appl. No.: 736,314

[22] Filed: May 21, 1985

[30] Foreign Application Priority Data

May 22, 1984 [JP] Japan .................. 59-104044

[51] Int. Cl.$^4$ ............................................. C08F 14/26
[52] U.S. Cl. .................................. 526/254; 526/247; 526/253; 526/255
[58] Field of Search ................ 526/247, 253, 254, 255

[56] References Cited

U.S. PATENT DOCUMENTS

| | | | |
|---|---|---|---|
| 3,859,262 | 1/1975 | Hartwimmer | 526/255 |
| 3,893,971 | 7/1975 | Ukihashi et al. | 526/255 |
| 4,123,602 | 10/1978 | Ukihashi et al. | 526/255 |
| 4,381,387 | 4/1983 | Sulzbach | 526/254 |
| 4,519,969 | 5/1985 | Murakami | 526/255 |
| 4,521,575 | 6/1985 | Nakagawa et al. | 526/253 |

*Primary Examiner*—Paul R. Michl
*Attorney, Agent, or Firm*—Birch, Stewart, Kolasch and Birch

[57] ABSTRACT

A copolymer comprising monomeric units derived from ethylene, tetrafluoroethylene and a fluorine-containing vinyl monomer which provides the copolymer with side chains having at least one carbon atom, wherein the molar ratio of tetrafluoroethylene and ethylene is from 62:38 to 90:10 and the content of the fluorine-containing vinyl monomer is from 0.1 to 10% by mole based on the total number of mole of ethylene and tetrafluoroethylene, which has improved flexibility and better flame retardance.

6 Claims, No Drawings

ETHYLENE/TETRAFLUOROETHYLENE COPOLYMER

FIELD OF THE INVENTION

The present invention relates to a novel copolymer comprising ethylene and tetrafluoroethylene (hereinafter referred to as "ETFE copolymer" ). More particularly, it relates to a novel ETFE copolymer which further comprises a certain specific fluorine-containing vinyl monomer as a modifier.

BACKGROUND OF THE INVENTION

A conventional ETFE copolymer is well known as an alternating copolymer having good cut-through resistance, melt-moldability, chemical resistance and electrical properties. However, it is highly crystalline and fragile at a high temperature. To overcome this drawback of the ETFE copolymer, it is proposed to copolymerize a third monomer as a modifier with ethylene and tetrafluoroethylene. For example, U.S. Pat. No. 3,624,250 discloses copolymerization of a vinyl monomer having no telogenic activity and providing the copolymer with side chains having at least two carbon atoms as the third monomer with ethylene and tetrafluoroethylene. However, as described on column 3, lines 36-44 of the specification of said patent, when the modifier vinyl monomer is copolymerized, the molar ratio of ethylene and tetrafluoroethylene should be from 60:40 to 40:60. Otherwise, tensile properties and cut-through resistance of the copolymer are unfavorably deteriorated. From this description, it is understood that the invention of said U.S. Patent intends to improve mechanical properties of the alternating copolymer at a high temperature while keeping the characteristics of the alternating copolymer as much as possible.

ETFE copolymer is required to have many diverse properties. For example, in case where it is used as a material of a laminate film with a rubber, it should be chemical resistant and flexible, that is, it should have low flexural modulus and small yield strength, so that it does not deteriorate low flexural modulus of the rubber. When a plug or stopper for a chemical vial is coated with such laminate film, sealing performance is improved due to its flexibility. Further, a flame resistant material is highly desired, for instance, as a coating material of a plenum cable. For example, when the conventional ETFE copolymer and polyvinylidene fluoride, which have substantially the same elementary composition, are examined for oxygen index, it is 30% for the former while 43% for the latter. Therefore, it is desired to improve ETFE copolymer to have a oxygen index not smaller than that of polyvinylidene fluoride.

SUMMARY OF THE INVENTION

One object of the present invention is to provide a novel ETFE copolymer with improved flexibility, namely low flexural modulus and small yield strength.

Another object of the present invention is to provide a novel ETFE copolymer with better flame retardance.

Accordingly, the present invention provides a copolymer comprising monomeric units derived from ethylene, tetrafluoroethylene and a fluorine-containing vinyl monomer which provides the copolymer with side chains having at least one carbon atom, wherein the molar ratio of tetrafluoroethylene and ethylene is from 62:38 to 90:10 and the content of the fluorine-containing vinyl monomer is from 0.1 to 10% by mole based on the total number of mole of ethylene and tetrafluoroethylene.

The present invention is based on the finding that ETFE copolymer comprising ethylene and tetrafluoroethylene in the above specific range of molar ratio satisfies the above described properties, which range is said to be undesirable in U.S. Pat. No. 3,624,250.

DETAILED DESCRIPTION OF THE INVENTION

In the copolymer of the invention, the molar ratio of tetrafluoroethylene and ethylene is from 62:38 to 90:10, preferably from 63:37 to 80:20. When the amount of tetrafluoroethylene is less than the lower limit, the copolymer becomes too hard and has too large flexural modulus and yield strength. In addition, its flame retardance is deteriorated. When the amount of tetrafluoroethylene is larger than the upper limit, its melt flowability is decreased.

The fluorine-containing vinyl monomer used as a modifier according to the invention may be any one that is copolymerizable with ethylene and tetrafluoroethylene and provides the copolymer with the side chains having at least one carbon atom. Examples of the fluorine-containing vinyl monomer are vinyl monomers of the formulas:

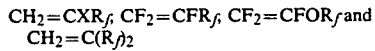

wherein X is hydrogen or fluorine, and $R_f$ is fluoroalkyl having 1 to 10 carbon atoms. Among them, the monomer of the formula: $CH_2=CXR_f$ is preferred due to its copolymerizability and availability. Particularly preferred is one in that $R_f$ is $C_1$-$C_8$ fluoroalkyl.

Specific examples of the above-mentioned fluorine-containing vinyl monomers are 1,1-dihydroperfluoropropene-1,1-dihydroperfluorobutene 1, 1,1,5-trihydroperfluoropentene-1, 1,1,7- trihydroperfluoroheptene-1, 1,1,2-trihydroperfluorohexene-1, 1,1,2-trihydroperfluorooctene- 1, 2,2,3,3,4,4,5,5,-octafluoropentyl vinyl ether, perfluoro (methyl vinyl ether), perfluoro vinyl ether), hexafluoropropene, perfluorobutene 1, 3,3,3-trifluoro-2-trifluoromethylpropene-1, etc.

The amount of the fluorine-containing vinyl monomer is from 0.1 to 10% by mole, preferably from 0.5 to 5% by mole based on the total number of moles of ethylene and tetrafluoroethylene. When it is smaller than 0.1% by mole, the copolymer is not desirably improved. When it is larger than 10% by mole, heat resistance of the copolymer is deteriorated.

The copolymer according to the invention may be prepared in the same manner as the conventional ETFE copolymer, for example, by a polymerization method such as suspension, emulsion, solution, bulk or gaseous phase copolymerization. Commercially, the suspension polymerization is preferably employed, in which the reaction is carried out in an aqueous medium containing chlorofluoroalkane as a solvent by using an organic peroxide as a polymerization initiator. Specific examples of chlorofluoroalkane are trichlorotrifluoroethane, dichlorotetrafluoroethane, dichlorodifluoromethane, chlorodifluoromethane, dichlorofluoromethane, etc. The amount of the solvent to be added to water is preferably from 10 to 100% by weight.

Preferred organic peroxide initiator is a peroxide of the formula:

$$(YC_mF_{2m}COO)_2 \quad (II)$$

wherein Y is hydrogen, fluorine or chlorine, and m is an integer of 2 to 8. Examples of the peroxide (II) are di-perfluoropropyonylperoxide, di(omega-hydroperfluorohexanoyl)peroxide, di(omega-chloroperfluoropropyonyl)peroxide, etc.

A peroxide of the formula:

$$[Cl(CF_2CFCl)_lCF_2COO)_2 \quad (III)$$

wherein 1 is an integer of 1 to 10 (e.g. di(trichloroperfluorohexanoyl)peroxide) and hydrocarbon type peroxides (e.g. diisobutylperoxide, diisopropylperoxydicarbonate etc.) are also preferred.

The reaction temperature is not critical in the copolymerization according to the present invention. It is preferably from 0° to 100° C. It is preferred to keep the temperature as low as possible in said temperature range so as to prevent the formation of ethylene-ethylene sequence.

The reaction pressure depends on the reaction temperature and the kind, amount and vapor pressure of the solvent in which the monomers are dissolved. Preferably, it is from 0 to 50 Kg/cm²G, practically from 1 to 15 Kg/cm²G.

In order to control the molecular weight of the copolymer, a chain transfer agent may be added to the polymerization system. Specific examples of the chain transfer agent are isopentane, n-hexane, cyclohexane, methanol, ethanol, carbon tetrachloride, chloroform, methylene chloride, methyl chloride, etc.

The novel ETFE copolymer according to the present invention is more flexible, namely it has lower flexural modulus and yield strength and has better flame retardance than the conventional one. Since it is flexible, when it is laminated on the surface of the plug, sealing characteristics of the plug with an opening of the vial are improved. In addition, when it is coated on an electric wire, it improves not only flame retardance of the wire but also handling of the wire in wiring.

PREFERRED EMBODIMENT OF THE INVENTION

The present invention will be hereinafter explained further in detail by following Examples, in which the characteristics of the obtained copolymers are measured and/or calculated as follows:

Monomeric Composition of Copolymer

The content of the fluorine-containing vinyl monomer is calculated by dividing the difference between the charged amount and the recovered amount by the weight of the obtained copolymer. The contents of ethylene and tetrafluoroethylene are calculated from the content of the fluorine-containing vinyl monomer and the results of elementary analysis.

Flow Rate

A Koka-type flow tester is used. A copolymer is extruded from an orifice of 2mm in inner diameter and 8 mm in land length at 300° C. under piston load of 7 Kg/cm². An amount (ml) extruded in one second is recorded.

Tensile Testing

A copolymer formed in a JIS (Japanese Industrial Standards) No. 3 dumbbell is stretched at a room temperature at a stretching rate of 200 mm/sec. to record yield strength, tensile strength at break and elongation at break.

Melting Point

A Perkin-Elmer II-type differential scanning calorimeter is used. A melting peak is recorded by raising a temperature at a rate of 20° C/min. and the temperature corresponding to the maximum value is assigned to the melting point of the copolymer.

Combustion Test

By means of an ON-1 type combustion tester (manufactured by Suga Shikenki Kabushikikaisha), oxygen index is measured according to ASTM D2863.

Flexural Modulus

By means of a stiffness tester (manufactured by Uejima Seisakusho), flexural modulus at a room temperature is measured.

Durometer Test

Durometer hardness (A-type and D-type) is measured according to ASTM D2240.

EXAMPLE 1

In a 4 l glass-lined autoclave, deoxygenated water (1.2 l) was charged and the interior was evacuated to a reduced pressure. Then, dichlorotetrafluoroethane (1 Kg) was charged and kept at 15° C. followed by the addition of $CH_2=CFC_3F_6H$ (4.5 g) and cyclohexane (0.5 ml). Thereafter, a gaseous mixture of tetrafluoroethylene and ethylene in a molar ratio of 97.4:2.6 was injected with stirring to pressurize to 6 Kg/cm²G. The reaction was initiated by the addition of di(omega-hydroperfluorohexanoyl)peroxide (2.1 g). As the reaction proceeded, the pressure dropped. Then, a mixture of tetrafluoroethylene, ethylene and $CH_2=CFC_3F_6H$ in a molar ratio of 62.7:33.8:3.5 was injected to keep the pressure constant at 6 Kg/cm²G. After continuing the reaction for 33 hours with the addition of the same peroxide twice every 2 hours (each 0.6 g) the reaction mixture was recovered to obtain the powdery copolymer (307 g). Monomeric composition, tetrafluoroethylene:ethylene:$CH_2=CF-C_3F_6H$=62.7:33.8:3.5 (by mole). M.P., 216.5° $1.1 \times 10^{-2}$ ml/sec. Yield strength, 136 Kg/cm². Tensile strength at break, 428 Kg/cm². Elongation at break, 415%. Flexural modulus, $8.0 \times 10^3$ Kg/cm². Oxygen index, 43%.

Durometer hardness of a laminate film comprising butyl rubber and a 100 micron thick film of the obtained copolymer was A-65. That of butyl rubber and the copolymer sheet was A-49 and D-56, respectively.

EXAMPLE 2

In the same manner as in Example 1 but initially charging 3.5 g. of $CH_2=CFC_3F_6H$ and 1.5 ml of cyclohexane, and additionally charging a monomeric mixture of tetrafluoroethylene, ethylene and $CH_2=CFC_3F_6H$ in a molar ratio of 63.3:34.0:2.7, the reaction was carried out for 27.7 hours to obtain the white powdery copolymer (311 g). Monomeric composition, tetrafluoroethylene:ethylene:$CH_2=CFC_3F_6H = 63.3:34.0:2.7$ (by mole). M.P., 225° C. Flow rate, $0.45 \times 10^{-2}$ ml/sec. Yield strength, 134 Kg/cm². Tensile strength at break, 435 Kg/cm². Elongation at break, 415%. Flexural modulus, $6.2 \times 10^3$ Kg/cm². Oxygen index, 45%.

Durometer hardness of a laminate film comprising butyl rubber and a 100 micron thick film of the obtained copolymer was A-66. That of the copolymer sheet was D-56.

EXAMPLE 3

In the same manner as in Example 1 but initially charging 6.8 g of $CH_2=CFC_5F_{10}H$ in place of $CH_2=CFC_3F_6H$, and additionally charging a monomeric mixture of tetrafluoroethylene, ethylene and $CH_2=CFC_5F_{10}H$ in a molar ratio of 62.9:33.8:3.3, the reaction was carried out for 16.25 hours to obtain the white powdery copolymer (86 g). Monomeric composition, tetrafluoroethylene:ethylene:$CH_2=CFC_5F_{10}H = 62.9:33.8:3.3$ (by mole). M.P., 220.6° C. Flow rate, $0.4 \times 10^{-2}$ ml/sec. Yield strength, 160.9 Kg/cm². Tensile strength at break, 447 Kg/cm². Elongation at break, 380%. Flexural modulus, $9.2 \times 10^3$ Kg/cm². Oxygen index, 43%.

EXAMPLE 4

In the same manner as in Example 1 but initially charging a monomeric mixture of tetrafluoroethylene and ethylene in a molar ratio of 98:2 and 0.15 ml of cyclohexane, and additionally charging a monomeric mixture of tetrafluoroethylene, ethylene and $CH_2=CFC_3F_6H$ in a molar ratio of 73.2:24.4:2.4, the reaction was carried out for 11 hours to obtain the white powdery copolymer (76.7 g). Monomeric composition, tetrafluoroethylene:ethylene:$CH_2=CFC_3F_6H = 73.2:24.4:2.4$ (by mole). M.P., 225.3° C. Flow rate, $3.0 \times 10^{-2}$ ml/sec. Yield strength, 176 Kg/cm². Tensile strength at break, 275 Kg/cm². Elongation at break, 375%. Flexural modulus, $7.0 \times 10^3$ Kg/cm². Oxygen index, 55%.

EXAMPLE 5

In the same manner as in Example 1 but initially charging 5.6 g of $CH_2=CHC_4F_9$ in place of $CH_2=CFC_3F_6H$, and post charging a monomeric mixture of tetrafluoroethylene, ethylene and $CH_2=CHC_4F_9$ in a molar ratio of 62.7:33.8:3.6, the reaction was carried out for 9.7 hours to obtain the white powdery copolymer (78.4 g). Monomeric composition, tetrafluoroethylene:ethylene:$CH_2=CHC_4F_9 = 62.7:33.8:3.6$ (by mole). M.P., 215.8° C. Flow rate, $0.52 \times 10^{-2}$ ml/sec. Yield strength, 139 Kg/cm². Tensile strength at break, 415 Kg/cm². Elongation at break, 375%. Flexural modulus, $7.0 \times 10^3$ Kg/cm². Oxygen index, 50%.

EXAMPLE 6

In the same manner as in Example 1 but initially charging 90 g of $CF_2=CFCF_3$ in place of $CH_2=CFC_3F_6H$, and additionally charging a monomeric mixture of tetrafluoroethylene and ethylene in a molar ratio of 65:35, the reaction was carried out for 1.7 hours to obtain the white powdery copolymer (69.2 g). Monomeric composition, tetrafluoroethylene:ethylene:$CF_2=CFCF_3 = 63.7:34.2:2.1$ (by mol M.P., 241.1° C. Flow rate, $0.2 \times 10^{-2}$ ml/sec. Yield strength, 93 Kg/cm². Tensile strength at break, 348 Kg/cm². Elongation at break, 427%. Flexural modulus, $4.8 \times 10^3$ Kg/cm². Oxygen index, 57%.

COMPARATIVE EXAMPLE 1

In a 3 l glass-lined autoclave, deoxygenated water (1.2 l) was charged and the interior was evacuated to a reduced pressure. Then, dichlorotetrafluoroethane (1 Kg) was charged and kept at 15° C. followed by the addition of $CH_2=CFC_3F_6H$ (9.5 g) and n-pentane (25 ml). Thereafter, a gaseous mixture of tetrafluoroethylene and ethylene in a molar ratio of 83.2:16.8 was injected with stirring to pressurize to 6 Kg/cm²G. The reaction was initiated by the addition of di(omega-hydroperfluorohexanoyl)peroxide (1.93 g). As the reaction proceeded, the pressure dropped. Then, a mixture of tetrafluoroethylene, ethylene and $CH_2=CFC_3F_6H$ in a molar ratio of 52.0:45.9:2.1 was injected to keep the pressure constant at 6 Kg/cm²G. After continuing the reaction for 5.5 hours with the addition of the same peroxide twice every 2 hours (each 1.16 g) the reaction mixture was recovered to obtain the powdery copolymer (89.8 g. g). Monomeric composition, tetrafluoroethylene:ethylene: $CH_2=CFC_3F_6H = 52.0:45.9:2.1$ (by mole). M.P., 268.5° C. Flow rate, $0.74 \times 10^{-2}$ ml/sec. Yield strength, 307 Kg/cm². Tensile strength at break, 520 Kg/cm². Elongation at break, 510%. Flexural modulus, $14.0 \times 10^3$ Kg/cm². Oxygen index, 27%.

Durometer hardness of a laminate film comprising butyl rubber and a 100 micron thick film of the obtained copolymer was A-74. That of the copolymer sheet was D-68.

COMPARATIVE EXAMPLE 2

In the same manner as in Example 1 but initially charging a monomeric mixture of tetrafluoroethylene and ethylene in a molar ratio of 94.0:6.0, and additionally charging a monomeric mixture of tetrafluoroethylene, ethylene and $CH_2=CFC_3F_6H$ in a molar ratio of 56.9:40.1:3.0, the reaction was carried out for 7 hours to obtain the white powdery copolymer (78.5 g). Monomeric composition, tetrafluoroethylene:ethylene:$CH_2=CFC_3F_6H = 56.9:40.1:3.0$ (by mole). M.P., 233.7° C. Flow rate, $0.18 \times 10^{-2}$ml/sec. Yield strength, 222 Kg/cm². Tensile strength at break, 445 Kg/cm². Elongation at break, 475%. Flexural modulus, $12.3 \times 10^3$ Kg/cm². Oxygen index, 31%.

Durometer hardness of the copolymer sheet was D-65.

These results are summarized in following Table.

TABLE

| Example No. | Modifier | TFE*[1]: Ethylene:Modifier (TFE:Ethylene) (Mole) | M.P. (°C.) | Flow rate × $10^{-2}$ (ml/cm²) | Elongation at break (%) | Yield strength (Kg/cm²) | Tensile strength at break (Kg/cm²) | Flexural modulus × $10^3$ (Kg/cm²) | Oxygen index (%) |
|---|---|---|---|---|---|---|---|---|---|
| 1 | $CH_2=CF-C_3F_6H$ | 62.7:33.8:3.5 (65.0:35.0) | 216.5 | 1.1 | 415 | 136 | 428 | 8.0 | 43 |

TABLE-continued

| Example No. | Modifier | TFE[1]: Ethylene:Modifier (TFE:Ethylene) (Mole) | M.P. (°C.) | Flow rate × $10^{-2}$ (ml/cm$^2$) | Elongation at break (%) | Yield strength (Kg/cm$^2$) | Tensile strength at break (Kg/cm$^2$) | Flexural modulus × $10^3$ (Kg/cm$^2$) | Oxygen index (%) |
|---|---|---|---|---|---|---|---|---|---|
| 2 | CH$_2$=CF—C$_3$F$_6$H | 63.3:34.0:2.7 (65.1:34.9) | 225 | 0.45 | 415 | 134 | 435 | 6.2 | 45 |
| 3 | CH$_2$=CF—C$_5$F$_{10}$H | 62.9:33.8:3.3 (65.0:35.0) | 220.6 | 0.4 | 380 | 160.9 | 447 | 9.2 | 43 |
| 4 | CH$_2$=CF—C$_3$F$_6$H | 73.2:24.4:2.4 (75.0:25.0) | 225.3 | 3.0 | 375 | 176 | 275 | 7.0 | 55 |
| 5 | CH$_2$=CH—C$_4$F$_9$ | 62.7:33.7:3.6 (65.0:35.0) | 215.8 | 0.52 | 375 | 139 | 415 | 7.0 | 50 |
| 6 | CF$_2$=CF—CF$_3$ | 63.7:34.2:2.1 (65.1:34.9) | 241.1 | 0.2 | 427 | 93 | 348 | 4.8 | 57 |
| Comp. 1 | CH$_2$=CF—C$_3$F$_6$H | 52.0:45.9:2.1 (53.1:46.9) | 268.5 | 0.74 | 510 | 307 | 520 | 14.0 | 27 |
| Comp. 2 | CH$_2$=CF—C$_3$F$_6$H | 56.9:40.1:3.0 (58.7:41.3) | 235.7 | 0.18 | 475 | 222 | 445 | 12.3 | 31 |

Note [1] Tetrafluoroethylene.

What is claimed is:

1. A copolymer comprising monomeric units derived from ethylene, tetrafluoroethylene and a fluorine-containing vinyl monomer of the formula CH$_2$=CXR$_f$ wherein X is a hydrogen or fluorine, and R$_f$ is a fluroalkyl having 1 to 8 carbon atoms which provides the copolymer with side chains having at least one carbon atom, the molar ratio of tetrafluoroethylene and ethylene is from 62:38 to 90:10 and the content of the fluorine-containing vinyl monomer is from 0.1 to 10% by mole based on the total number of moles of ethylene and tetrafluoroethylene.

2. The copolymer according to claim 1, wherein the molar ratio of ethylene and tetrafluoroethylene is from 63:37 to 80:20.

3. The copolymer according to claim 1, wherein the content of the fluorine-containing vinyl monomer is from 0.5 to 5% by mole based on the total number of mole of ethylene and tetrafluoroethylene.

4. The coplymer according to claim 1, wherein the fluorine-containing vinyl monomer is one selected from the group consisting of 1,1-dihydroperfluoropropene-1, 1,1-dihydroperfluorobutene-1, 1,1,5-trihydroperfluoropentene-1, 1,1,7-trihydroperfluoroheptene-1, 1,1,2-trihydroperfluorohexene-1 and 1,1,2-trihydroperfluorooctene-1.

5. The copolymer according to claim 1, wherein the content of the fluorine-containing vinyl monomer is from 0.5 to 5% by mole based on the total number of moles of ethylene and tetrafluoroethylene.

6. A copolymer comprising monomeric units derived from ethylene, tetrafluoroethylene and a fluorine-containing vinyl monomer of the formula CH$_2$=CXR$_f$ wherein X is a hydrogen or fluorine, and R$_f$ is a fluoroalkyl having 1 to 10 carbon atoms which provides the copolymer with side chains having at least one carbon atom, the molar ratio of tetrafluoroethylene and ethylene is from 62:38 to 90:10 and the content of the fluorine-containing vinyl monomer is from 0.1 to 10% by mole based on the total number of moles of ethylene and tetrafluoroethylene, said copolymer having an effective flexural modulus.

* * * * *